Figure 1:
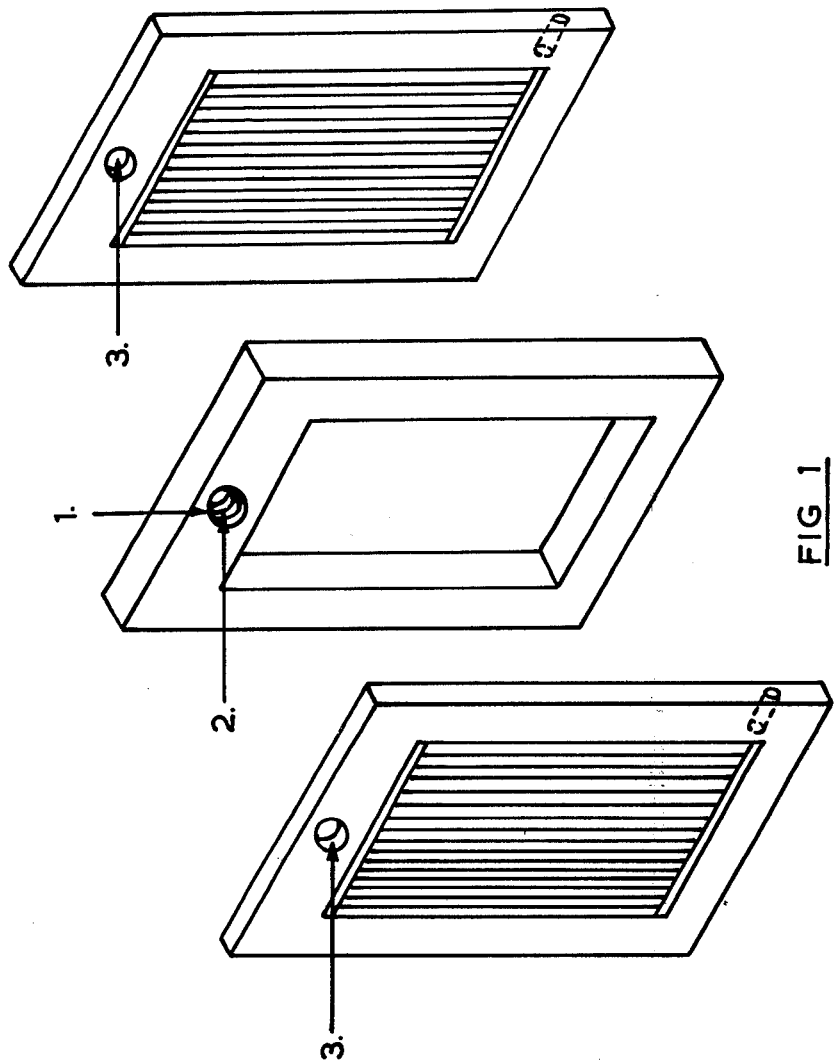

United States Patent [19]
Davison

[11] 3,879,291
[45] Apr. 22, 1975

[54] FILTRATION PROCESS

[75] Inventor: Raymond Davison, Manchester, England

[73] Assignee: Imperial Chemical Industries Limited, Millbank, London, England

[22] Filed: Nov. 22, 1972

[21] Appl. No.: 308,745

[30] Foreign Application Priority Data
Nov. 16, 1971 United Kingdom............... 53088/71

[52] U.S. Cl................................. 210/231; 210/541
[51] Int. Cl............................................. B01d 25/12
[58] Field of Search ........... 210/231, 230, 229, 228, 210/227, 226, 225, 224, 541

[56] References Cited
UNITED STATES PATENTS
2,225,024  12/1940  Weber ................................ 210/541
3,278,033  10/1966  Winterstein......................... 210/231
3,615,015  10/1971  Busse et al.......................... 210/231

FOREIGN PATENTS OR APPLICATIONS
831,613  9/1938  France ............................... 210/231

Primary Examiner—Roy Lake
Assistant Examiner—DeWalden W. Jones
Attorney, Agent, or Firm—Cushman, Darby & Cushman

[57] ABSTRACT

A frame for a plate and frame filter press comprising a metal reinforced moulded rubber framework having an inlet port and also at least one discharge port so disposed with relation to the inlet port that the contents of the chamber after filtration is complete can be flushed from the chamber through the discharge port without separating the plates and frame.

2 Claims, 6 Drawing Figures

FILTRATION PROCESS

This invention relates to a new filtration process and also to the filtration apparatus for carrying out this process.

In the conventional filter press, used to separate suspended solids from liquors after chemical processes, plates and frames are alternated, with a filter cloth being placed between each whereby each frame and the associated filter cloths form a chamber. The liquor containing suspended matter is introduced into this chamber by means of an inlet port and the filtrate passes through the cloth and then through discharge ports in the plates whence it may be collected or run to drain as desired. The solid material is then recovered by separating the plates and frames and transferring the press cake to trays or other vessels according to whether this solid is the desired product or an undesired by-product. In the normal course of events, this transference involves considerable manual labour in the digging out of the solid from the chamber or from the bed beneath the filter press.

The present invention is concerned with a modified filter press whereby the solid products, particularly those which are to be discarded or subsequently retreated with aqueous liquors can be recovered without opening the press, in the form of a suspension or solution. Advantages arising from the invention include a higher rate of utilisation of the filter press as well as the abandonment of the heavy physical labour or disagreeable working conditions involved in removal of the press cake from an opened filter press.

The basic idea from which the invention arises is to provide a frame for a filter press of the kind described above, having an inlet port and also at least one discharge port so disposed with relation to the inlet port that the contents of the chamber after filtration is complete can be flushed from the chamber through the discharge port without separating the plates and frame.

In investigating the possibility of such a device it has been found that whereas simple wooden frames can be constructed to provide the desired effect, they are not suitable for commercial operation since structural weaknesses occur around the ports, leaks occur at the fabricated joints due to shrinkage and distortion of the wood and folds in the cloth and particles of filtered material trapped in the jointing faces between plates and frames cause indentations resulting in leaks. These restrict the potential working pressures available both for filtration and press discharging purposes. These disadvantages have been overcome by constructing the frame and associated plates from metal-reinforced moulded rubber materials.

According to the present invention, therefore, there is provided a frame for a plate and frame filter press comprising a metal reinforced moulded rubber framework having an inlet port and also at least one discharge port so disposed with relation to the inlet port that the contents of the chamber after filtration is complete can be flushed from the chamber through the discharge port without separating the plates and frame.

It is preferred that the inlet port and the discharge port or ports are located in relation to each other on the frame in such positions that in the made-up press the inlet port can be placed in an uppermost position and the discharge port or ports at the bottom of the frame so that the contents of the chamber can be flushed out in their entirety with the assistance of gravitational flow. For example, the filter frame may be substantially square or rectangular in shape, and have the inlet and discharge ports located on frame members parallel to each other.

The discharge port may, if desired, communicate directly with an aperture on the outer surface of the frame so that each frame in the press has an individual outlet to the atmosphere for drainage. In general, however, it is preferred to have the discharge port communicate with a passageway running between the faces of the frame adjoining the plates in the made-up press, there being corresponding passageways in the plates so that a single drainage channel is formed in the made-up press.

Figure 2:
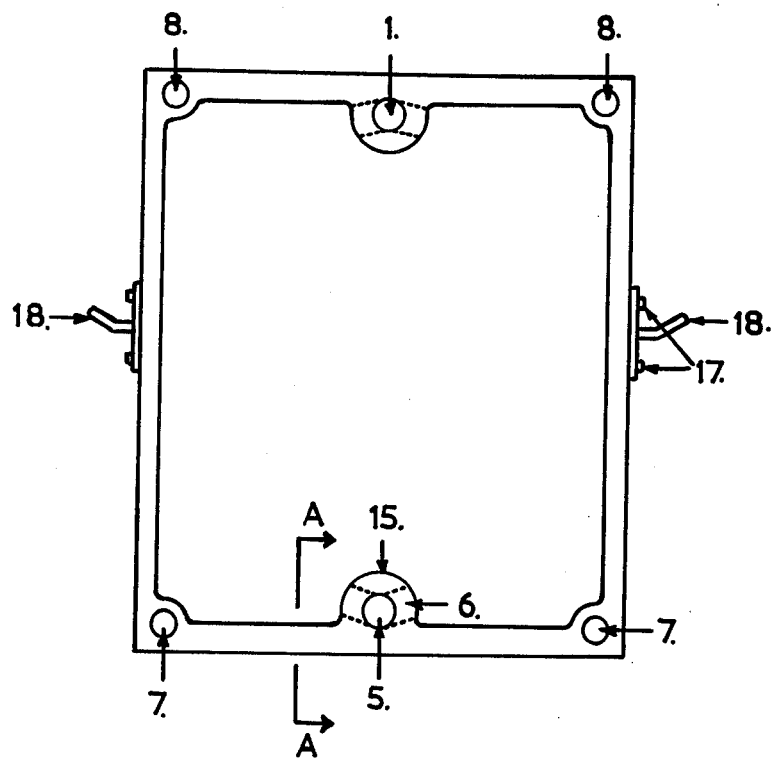
Figure 3:
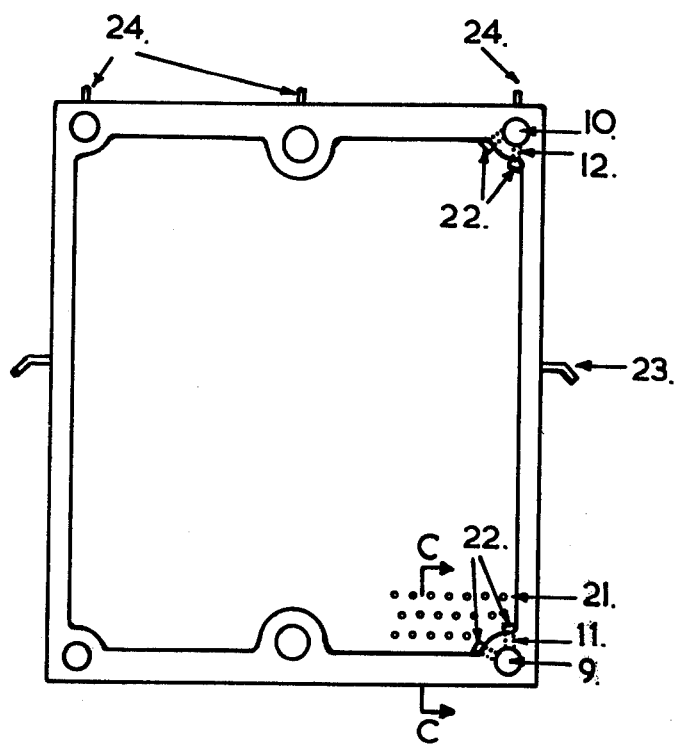
Figure 4:
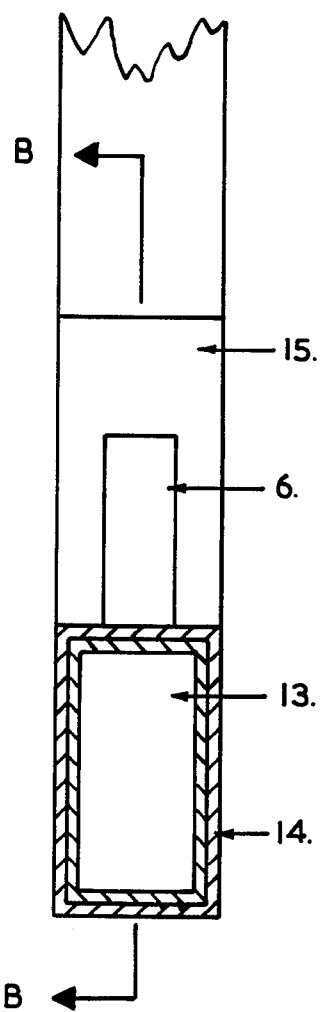
Figure 5:
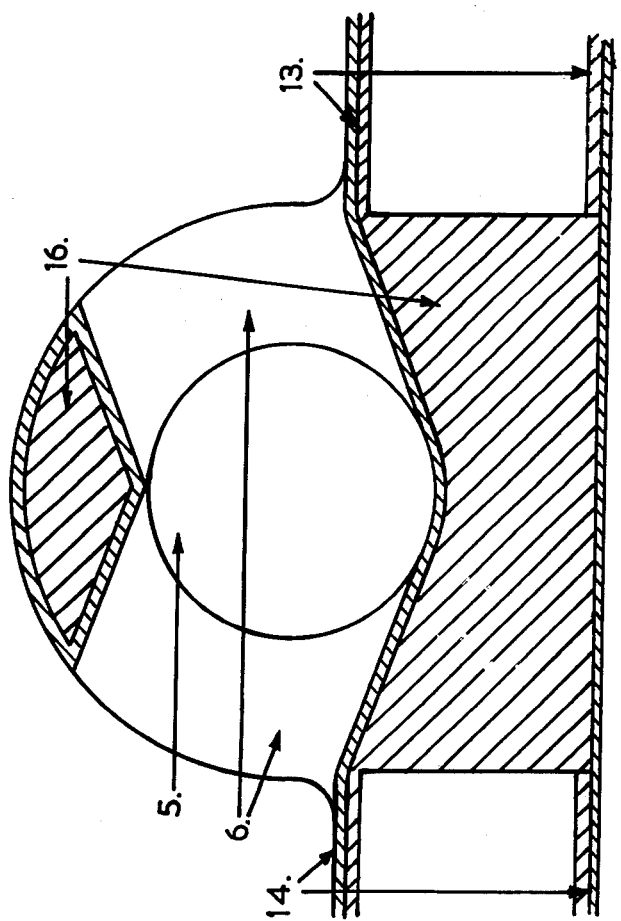
Figure 6:
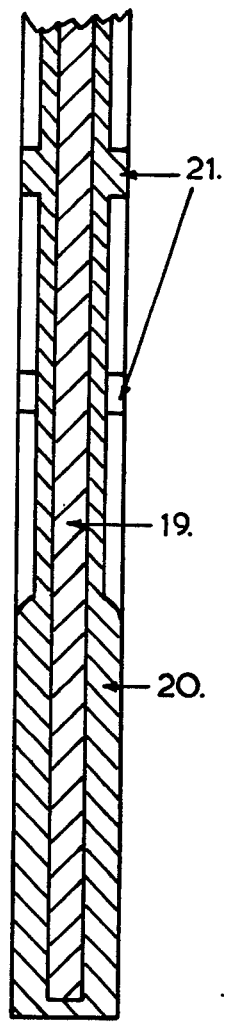

A preferred construction of a frame of the invention together with its associated plate is depicted in the drawings accompanying the specification, in which:

FIG. 1 represents an exploded perspective view of a typical known wooden frame with two associated plates, FIG. 2 and 3 represent, respectively, elevations of a rubber-moulded, mild steel reinforced frame of the invention and of an associated plate of the same materials, FIG. 4 represents a cross-section of the frame of FIG. 2 along line AA, FIG. 5 represents an enlarged cross-sectional view of the discharge port of FIG. 2, taken along line BB of FIG. 4, and FIG. 6 represents an enlarged cross-sectional view of a portion of FIG. 3 taken along the line CC.

Referring to FIG. 1, the frame comprises a generally rectangular-shaped wooden framework of two horizontal and two vertical spars, the upper horizontal spar having a passageway 1 connecting the two vertical end faces which come into contact with the filter cloth pressed thereon by the plates. From this passageway a slot 2 extends to the lower surface of the spar, thus forming an inlet port to the chamber bounded by the frame and the filter cloths. The plates associated with this frame have passageways 3 bored in alignment with the passageway 1 of the frame.

In FIGS. 2, 4 and 5, the frame consists of a mild steel rectangular hollow box frame 13 having a moulded rubber coating 14. Suitable dimesions are, for example, a croso-section for the frame of 2½ × 1½ inches inch and a coating of approximately one-eighth inch. Each of the mouldings on the shorter arms contains a centrally-placed inward semi-circular extension 15 which is reinforced by a mild steel trunnion 16 welded to the frame. The trunnion and its coating is bored with a hole of about 3 inch diameter, rectangular slots 3×3¾ inch in the rubber extension being in alignment with the slots in the trunnion, the fitments thus forming inlet and discharge ports communicating with ducts running between the jointing faces of the frame. In each corner of the frame a 2 inch diameter mild steel boss is positioned, providing a drainage duct and a duct for washing liquids supplied to the plates as described below. Handles 18 are provided being attached to the frame by bolts 17 screwing into nuts welded to the steel framework; the handles can equally be welded directly to the steel framework.

In FIGS. 3 and 6, the plate consists of a mild steel sheet 19 covered with moulded rubber 20, which is thicker round the periphery to provide a framework surrounding a recessed inner drainage area both surfaces of which are covered with integrally-moulded projections inches and quadrant inward projections of the frame carry passageways in positions which align with passageways 1, 5, 7 and 8 of FIG. 2; of the passageways in the angles, two (9 and 10 in the drawings) each has a pair of ducts 11 and 12 connecting it to the inner surface and the recessed central portion carries slots 22 to facilitate access between the ducts and both surfaces of the recessed portion. Handles 23 of bent rod fit into holes bored in the moulded rubber and cloth pegs 24 are provided on one of the arms of the frame.

All ports and passageways in the frame and plate are coated with rubber to prevent corrosion. It is to be understood in this connection that the term "rubber" includes any natural or synthetic elastomeric material which can be moulded and bonded to the reinforcing mild steel frame or sheet.

When making up the press the plates are arranged so that the ducted passages occur alternately on each side of the centre line of the press, and switching arrangements are made to the supply and drainage pipes so that washing water can be supplied to either side and drainage can be taken from either side. This arrangement makes possible a wide variety of washing conditions.

The assembled press can be used, e.g. in the following manner:

Referring to FIGS. 2 and 3 the valves (not shown) controlling passageways 8 and 5 are closed and those controlling passageways 7 are opened. The suspension to be filtered is admitted to the press through passageway 1 whereupon the solid is retained in the chamber formed by the filter cloths and the frame, and the filtrate percolates down the plate and through ducts 11 to the passageways formed by 9 and 7, being collected or discarded as desired. When the press is sufficiently full, the valve (not shown) controlling 1 is closed and excess liquor is blown out of the paste by compressed air admitted through passageway 1. The solid cake can be washed by washing water admitted through passage 9 and the wash liquor leaving via passage 10.

For emptying the press without separating the plates and frames, the valve controlling passageway 5 is opened and water admitted through passageway 1 and also, advantageously through passageway 9, thus improving the removal of the solid from the surface of the filter cloth. A simple method of checking when the press is empty of solid is to blow out all the water by admitting compressed air through 1, then measure the amount of water required to refill the press and compare this amount with the known volume of the empty press.

The press and above-described method of using it, are useful, e.g. in the removal of iron oxide residues from iron reductions of nktro compounds, and also for products which after filtration are to be repasted in aqueous media for purification or for further reaction.

I claim:

1. A frame for a plate and frame filter press comprising a metal reinforced moulded rubber framework encircling an open space and having an inlet port in said framework directly communicating with said open space and means for allowing the contents of the open space after filtration is complete to be flushed out without separating the plates and frame, said means comprising a discharge port in said framework directly communicating with said open space 2. A frame as claimed in claim 1 of square or rectangular shape having the inlet and outlet ports disposed on parallel frame members.

* * * * *